US012577830B2

(12) United States Patent
Stelzer et al.

(10) Patent No.: US 12,577,830 B2
(45) Date of Patent: Mar. 17, 2026

(54) METHOD FOR CONTROLLING A GLAZING UNIT HAVING ELECTRICALLY CONTROLLABLE OPTICAL PROPERTIES

(71) Applicant: SAINT-GOBAIN GLASS FRANCE, Courbevoie (FR)

(72) Inventors: Richard Stelzer, Düsseldorf (DE); Bastian Klauss, Kempen (DE); Doane Shelby Craig, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 280 days.

(21) Appl. No.: 18/549,850

(22) PCT Filed: Apr. 13, 2022

(86) PCT No.: PCT/EP2022/059916
§ 371 (c)(1),
(2) Date: Sep. 8, 2023

(87) PCT Pub. No.: WO2022/223409
PCT Pub. Date: Oct. 27, 2022

(65) Prior Publication Data
US 2024/0151100 A1 May 9, 2024

(30) Foreign Application Priority Data

Apr. 19, 2021 (EP) ..................................... 21169057
Jul. 1, 2021 (EP) ..................................... 21183018

(51) Int. Cl.
| E06B 9/24 | (2006.01) |
| B60J 3/04 | (2006.01) |
| G02F 1/01 | (2006.01) |

(52) U.S. Cl.
CPC .................... E06B 9/24 (2013.01); B60J 3/04 (2013.01); G02F 1/0123 (2013.01); *E06B 2009/2464* (2013.01)

(58) Field of Classification Search
CPC ...... E06B 9/24; E06B 2009/2464; B60J 3/04; G02F 1/0123; B32B 2250/40;
(Continued)

(56) References Cited

U.S. PATENT DOCUMENTS

| 2012/0026573 | A1 | 2/2012 | Collins et al. | |
| 2020/0292902 | A1 | 9/2020 | Waldmann et al. | |
| 2021/0384764 | A1* | 12/2021 | Shrivastava | ............ H02J 50/10 |

FOREIGN PATENT DOCUMENTS

| CN | 109324457 A | 2/2019 |
| CN | 109496277 A | 3/2019 |
(Continued)

OTHER PUBLICATIONS

FR International Search Report as issued in International Patent Application No. PCT/EP2022/059916, dated Jun. 8, 2022.
(Continued)

*Primary Examiner* — Mariam Qureshi
(74) *Attorney, Agent, or Firm* — Pillsbury Winthrop Shaw Pittman LLP

(57) ABSTRACT

A method for electrical control of a functional element incorporated in a glazing unit and having electrically controllable optical properties. The glazing unit includes a composite pane having an outer pane and an inner pane which are connected to one another via a thermoplastic intermediate layer, a functional element is arranged between the outer pane and the inner pane and has an active layer having electrically controllable optical properties between a first planar electrode and a second planar electrode, the optical properties are controlled by a control unit connected
(Continued)

Figure 1:
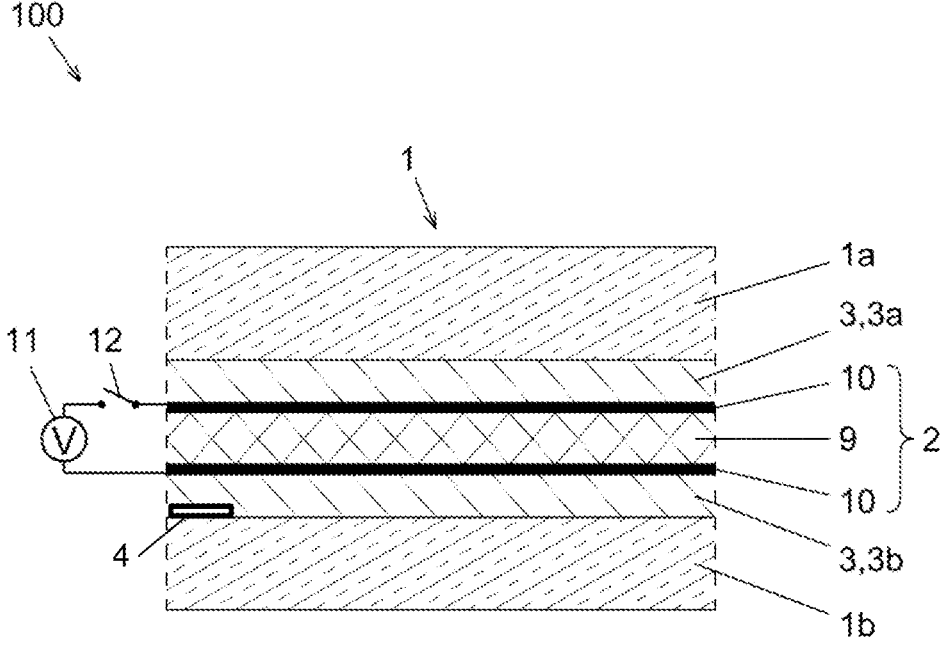

100 to at least two transparent planar electrodes of the functional element, and an electrical voltage is applied between the planar electrodes by the control unit. An inverse function is used to determine a magnitude of the electrical voltage, and also as a temperature-dependent linearization function and a temperature of the functional element or composite pane is detected by a temperature sensor.

18 Claims, 3 Drawing Sheets

(58) Field of Classification Search
CPC ............ B32B 2255/10; B32B 2255/20; B32B
2255/205; B32B 2307/202; B32B
2307/4023; B32B 2307/4026; B32B
2307/41; B32B 2307/412; B32B
2307/414; B32B 2605/08; B32B 3/02;
B32B 7/12; B32B 17/10036; B32B
17/1011; B32B 17/10192; B32B
17/10211; B32B 17/1022; B32B
17/10302; B32B 17/10348; B32B
17/10504; B32B 17/10513; B32B
17/10532; B32B 17/10761; B32B
17/1077; B32B 17/10788; B32B 27/08;
B32B 27/30; B32B 27/306; B32B 27/36;
B32B 27/40; B32B 3/08; B32B 17/10467;
B32B 2457/20
See application file for complete search history.

(56) References Cited

FOREIGN PATENT DOCUMENTS

| CN | 111727116 A | 9/2020 | |
|----|-------------|--------|---|
| CN | 112154065 A | 12/2020 | |
| DE | 20 2019 100577 U1 | 3/2019 | |
| EP | 0 876 608 B1 | 4/2002 | |
| WO | WO 2011/033313 A1 | 3/2011 | |
| WO | WO 2012/007334 A1 | 1/2012 | |
| WO | WO-2019011891 A1 * | 1/2019 | ............ G02F 1/166 |

OTHER PUBLICATIONS

Lee, J., et al., "Power Electronic Converter Topology with Regulable Transmittance of PDLC Applications," 2018 21st International Conference on Electrical Machines and Systems (ICEMS), Oct. 2018, XP033451768, pp. 2437-2350.
Office Action and Search Report as issued in Chinese Patent Application No. 202280001384.1, dated Aug. 23, 2025.

* cited by examiner

METHOD FOR CONTROLLING A GLAZING UNIT HAVING ELECTRICALLY CONTROLLABLE OPTICAL PROPERTIES

CROSS-REFERENCE TO RELATED APPLICATIONS

This application is the U.S. National Stage of PCT/EP2022/059916, filed Apr. 13, 2022, which in turn claims priority to European patent application number 21183018.7 filed Jul. 1, 2021 and European patent application number 21169057.3 filed Apr. 19, 2021. The content of these applications are incorporated herein by reference in their entireties.

The invention relates to a method for controlling a glazing unit having electrically controllable optical properties, to a glazing unit, and to a use of the glazing unit.

Functional elements having electrically controllable optical properties are used in the industrial production of glazing units. Such glazing units are frequently composite panes in which a functional element is embedded. The composite panes consist of at least one outer pane, an inner pane and an adhesive intermediate layer, which connects the outer pane to the inner pane in a planar manner. Typical intermediate layers are polyvinyl butyral films which, in addition to their adhesive properties, have high toughness and a high acoustic damping effect. The intermediate layer prevents the disintegration of the composite pane when damaged. The composite pane does crack but remains inherently stable.

Composite panes having electrically controllable optical properties are known from the prior art. Such composite panes contain a functional element, which typically contains an active layer between two planar electrodes. The optical properties, in particular the transmission of visible light, of the active layer can be changed by a voltage applied to the planar electrodes. An example of this are electrochromic functional elements known, for example, from US 20120026573 A1 and WO 2012007334 A1. Another example is suspended particle device (SPD) functional elements or polymer dispersed liquid crystal (PDLC) functional elements known, for example, from EP 0876608 B1 and WO 2011033313 A1. By applying voltage, the transmission of visible light can be controlled by electrochromic SPD/PDLC functional elements.

SPD and PDLC functional elements are commercially available as multilayer films. The planar electrodes required for applying a voltage are arranged between two PET carrier films. During the manufacture of the glazing unit, the functional element is cut to the desired size and shape from the multilayer film and embedded between the films of an intermediate layer. Via flat conductors, the planar electrodes are electrically conductively connected outside the composite pane to a control module (ECU). The control module is designed to apply an electrical voltage between the planar electrodes.

Windshields have been proposed in which an electrically controllable sun shield is realized by a functional element in order to replace the mechanically foldable sun visor in motor vehicles.

WO 2019/011891 A1 discloses a device for operating a functional element having electrically controllable optical properties.

However, a glazing unit with such a functional element has a temperature dependence of its transmission or also transparency. In many cases, the switchable functional elements have a characteristic curve which deviates significantly from a straight line and makes reproducible switching behavior difficult.

The object of the present invention is to provide an improved method in which the switching behavior of the transparency is improved.

The object of the present invention is achieved according to the invention by a method according to independent claim 1. Preferred embodiments of the invention emerge from the dependent claims.

According to the invention, the method for electrically controlling at least one functional element that is embedded in a glazing unit and has electrically controllable optical properties comprises a glazing unit. The glazing unit comprises a composite pane having an outer pane and an inner pane. The outer pane and the inner pane are connected to one another via a thermoplastic intermediate layer. The functional element is arranged between the outer pane and the inner pane and has an active layer having electrically controllable optical properties between a first planar electrode and a second planar electrode. The optical properties are controlled by means of a control unit, wherein the control unit is connected to at least two transparent planar electrodes of the functional element. An electrical voltage is applied between the planar electrodes by means of the control unit.

An inverse function is used to determine a magnitude of the electrical voltage, wherein the inverse function is used as a temperature-dependent linearization function. Here, a temperature of the functional element is detected by means of a temperature sensor and is transmitted to the control unit. The magnitude of the electrical voltage is ascertained by means of the control unit as a function of the temperature of the functional element and is applied between the planar electrodes.

The invention is based on the finding that the switching behavior of electrically switchable functional elements is temperature-dependent. An electrical voltage applied to the planar electrodes leads to a change in the optical properties, in particular transparency, which is the greater, the higher the temperature of the functional element or the composite pane is. If the inverse function is used as a temperature-dependent linearization function, a nonlinear calibration function can be linearized. In other words, the linearization function is the inverse function of the calibration function, in particular of the temperature-dependent calibration function. Thus, if the inverse function is used as a temperature-dependent linearization function, a switching state at a given temperature can be set precisely.

According to the invention, the temperature of the functional element or of the composite pane is determined in order to adapt the voltage to be applied to this temperature. It is assumed here that the composite pane overall has a homogeneous temperature, i.e., the temperature of the functional element matches the temperature of other regions of the composite pane, which is typically at least approximately the case. Accordingly, the determination of the temperature of the composite pane corresponds at least approximately to the determination of the temperature of the functional element.

Preferably, the glazing unit, in particular the composite pane, is equipped with the temperature sensor. The temperature sensor is connected to the control unit in such a way that the control unit can ascertain the temperature of the composite pane by means of the temperature sensor. The measurement signal of the temperature sensor is thus transmitted to the control unit and evaluated there so that the control unit determines the temperature of the composite pane by means of the temperature sensor. The temperature sensor can be integrated in the composite pane by being embedded in the intermediate layer. Alternatively, the temperature sensor may be fastened externally to the composite pane or assigned thereto. The temperature sensor is preferably fastened to the inner pane. The temperature sensor may also be arranged in the control unit itself or in a fastening element with which the control unit is fastened to the composite pane. In principle, it is also possible to use a temperature sensor that is not directly fastened to or integrated in the composite pane but measures the temperature at a distance, for example an IR sensor (infrared sensor) that is arranged in the vicinity of the composite pane and oriented toward it. The temperature of the functional element or of the composite pane can be 30° C. to 80° C., in particular in the range of 40° C. to 60° C.

In an advantageous embodiment, the temperature sensor is arranged in the glazing unit on a flat conductor or a flexible circuit board.

In another advantageous embodiment, the temperature sensor is a temperature-dependent resistor. Preferably, a PTC resistor or PTC thermistor is used as the temperature sensor. Particularly preferably, platinum resistors, for example Pt100, are used for the temperature measurement.

In a further advantageous embodiment, the temperature sensor is spatially assigned to the functional element and detects an actual temperature of the functional element. In this case, the temperature sensor is arranged and designed such that it can detect the temperature of the functional element. The temperature sensor can preferably be applied to the functional element. By arranging the temperature sensor on the functional element, not only can the actual temperature of the functional element be directly detected, but the manufacture of the glazing unit can also be simplified. In principle, the temperature sensor can be placed at any position in the glazing unit.

Preferably, a transparency value of the functional element is ascertained as a function of the temperature of the functional element.

The planar electrodes are preferably designed as transparent, electrically conductive layers. The planar electrodes preferably contain at least one metal, a metal alloy or a transparent conducting oxide (TCO). The planar electrodes can contain, for example, silver, gold, copper, nickel, chromium, tungsten, indium tin oxide (ITO), gallium-doped or aluminum-doped zinc oxide and/or fluorine-doped or antimony-doped tin oxide. The planar electrodes preferably have a thickness of 10 nm (nanometer) to 2 μm (micrometer), particularly preferably 20 nm to 1 μm, very particularly preferably 30 nm to 500 nm. The planar electrodes are preferably formed free of insulation lines. The planar electrodes can be formed to cover the entire surface. They then have no subdivisions or segments.

The invention also comprises a glazing unit. The glazing unit comprises the composite pane consisting of at least one outer pane and one inner pane which are connected to one another via a thermoplastic intermediate layer. The functional element is embedded in the thermoplastic intermediate layer. The glazing unit is provided for separating the interior from the external environment in a window opening of, for example, a vehicle, a building or a room. In the context of the invention, the term "inner pane" is understood to mean the pane facing the interior. "Outer pane" refers to the pane facing the external environment. The thermoplastic intermediate layer serves to connect the two panes.

The glazing unit and the method are described together, wherein explanations and preferred embodiments relate equally to glazing unit and method. If preferred features are described in connection with the method, this means that the glazing unit is preferably designed and is suitable accordingly. If, on the other hand, preferred features are described in connection with the glazing unit, this means that the method is also preferably carried out accordingly.

The thermoplastic intermediate layer contains at least one thermoplastic polymer, preferably ethylene vinyl acetate (EVA), polyvinyl butyral (PVB) or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, more preferably from 0.3 mm to 1 mm.

The outer pane and the inner pane are preferably made of glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes of a thickness in the range of 0.8 mm to 5 mm, preferably of 1.4 mm to 2.5 mm, are used, for example those with the standard thicknesses of 1.6 mm or 2.1 mm.

The outer pane, the inner pane and the thermoplastic intermediate layer can be clear and colorless, but also tinted or colored. A corresponding glazing unit used as a windshield must have sufficient light transmission in the central viewing area, preferably at least 70% in the main viewing area A according to ECE-R43. Independently of each other, the outer pane and the inner panes can be not prestressed, partially prestressed or prestressed. If at least one of the panes should be prestressed, this can be thermal or chemical prestressing.

The outer pane, the inner pane and/or the intermediate layer can have further suitable coatings known per se, for example anti-reflective coatings, non-stick coatings, anti-scratch coatings, photocatalytic coatings or sun protection coatings or low-e coatings.

The outer pane and the inner pane are laminated together via the intermediate layer, for example by autoclave processes, vacuum bag processes, vacuum ring processes, calendering processes, vacuum laminators, or combinations thereof. The outer pane and inner pane are usually connected under the effect of heat, vacuum and/or pressure.

The glazing unit comprises a functional element that has electrically controllable optical properties and is embedded in the intermediate layer. The functional element is typically arranged between at least two layers of thermoplastic material of the intermediate layer, wherein it is connected to the outer pane by the first layer and to the inner pane by the second layer.

Such a functional element comprises at least the active layer arranged between a first carrier film and a second carrier film. The active layer has the variable optical properties that can be controlled by an electrical voltage applied to the active layer. In the context of the invention, electrically controllable optical properties are understood to mean properties that are continuously controllable, but also properties that can be switched between two or more discrete states. The optical properties relate in particular to the transparency (transmission, also called light transmission) and/or the scattering behavior. The functional element moreover comprises planar electrodes for applying the voltage to the active layer, which are preferably arranged between the carrier films and the active layer.

In an advantageous embodiment, the functional element is a PDLC functional element, in particular one that switches at least one region of the glazing unit from a transparent into an opaque state, and vice versa. The active layer of a PDLC functional element contains liquid crystals which are embedded in a polymer matrix. In a further preferred embodiment, the functional element is an SPD functional element. The active layer contains suspended particles, wherein the absorption of light through the active layer can be changed by applying a voltage to the planar electrodes.

The planar electrodes and the active layer are arranged substantially parallel to the surfaces of the outer pane and the inner pane. The planar electrodes are connected to an external voltage source. The electrical contact as well as the connection to the energy source of the active layer is realized by suitable connecting cables, for example flat conductors or foil conductors, which are optionally connected to the planar electrodes via so-called bus bars, for example strips of an electrically conductive material or electrically conductive imprints. The thickness of the functional element is, for example, from 0.4 mm to 1 mm.

The invention also comprises a glazing unit of a vehicle or building, at least comprising a composite pane having electrically controllable optical properties. The composite pane comprises the outer pane and the inner pane, which are connected to one another via a thermoplastic intermediate layer, and into which a functional element having electrically controllable optical properties is embedded. The functional element has an active layer which is assigned transparent planar electrodes on both surfaces. Furthermore, the glazing unit comprises a control unit for electrically controlling the optical properties of the glazing unit according to the method according to the invention, which is connected to the planar electrodes of the functional element and is designed to apply an electrical voltage between the planar electrodes.

In a preferred embodiment, the functional element is a PDLC functional element, an SPD functional element or an electrochromic functional element.

In a preferred embodiment, the functional element is a PDLC (polymer-dispersed liquid crystal) functional element. The active layer of a PDLC functional element contains liquid crystals which are embedded in a polymer matrix. If no voltage is applied to the planar electrodes, the liquid crystals will be aligned in an unordered manner, which results in strong scattering of the light passing through the active layer. If a voltage is applied to the planar electrodes, the liquid crystals will align in a common direction and the transmission of light through the active layer is increased. However, other functional elements can also be used, the variability of whose optical properties is based on liquid crystals, for example PNLC (polymer-networked liquid crystal) functional elements.

In a further preferred embodiment, the functional element is an SPD (suspended-particle device) functional element. The active layer contains suspended particles, wherein the absorption of light through the active layer can be changed by applying a voltage to the planar electrodes.

In a further preferred embodiment, the active layer of the functional element is an electrochemically active layer. Such functional elements are known as electrochromic functional elements. The transmission of visible light is dependent on the extent to which ions are embedded in the active layer, wherein the ions are provided, for example, by an ion storage layer between the active layer and a planar electrode.

Transmission can be influenced by the voltage applied to the planar electrodes, which causes migration of the ions. Suitable functional layers contain, for example, at least tungsten oxide or vanadium oxide.

In a preferred embodiment, the control unit comprises a DC-DC converter and/or an inverter. Since the on-board voltage of a vehicle is, for example, 12 to 14 V, it is not sufficient to operate a functional element. The control unit is therefore preferably equipped with a DC-DC converter. The DC-DC converter is provided to convert a DC voltage as a primary voltage into a higher secondary voltage (for example 65 V). In an advantageous embodiment, the secondary voltage can be 5 V to 70 V. Furthermore, the temperature sensor and a voltage supply unit are coupled to the control unit.

The inverter is provided to convert the secondary voltage into an AC voltage, wherein the secondary voltage is applied to the planar electrodes. This is particularly advantageous if the glazing unit is installed in a vehicle and connected to the on-board voltage of the vehicle. The control unit has an inverter in order to convert the DC voltage of a vehicle into an AC voltage. The AC voltage can be from 5 V to 50 V.

The composite pane can be equipped with an opaque cover printing, in particular in a peripheral edge region, as is common practice in the vehicle sector, in particular for windshields, rear windows and roof panes. The cover printing is typically made of an enamel containing glass frits and a pigment, in particular black pigment. The printing ink is typically applied in a screen printing method and is then burned in. Such a cover printing is applied to at least one of the pane surfaces, preferably the interior surface of the outer pane and/or inner pane. The cover printing preferably surrounds a central see-through region in a frame-like manner and serves in particular to protect the adhesive, by which the composite pane is connected to the vehicle body, against UV radiation. If the control unit and the temperature sensor are attached to the inner pane, then preferably in the opaque edge region of the cover printing.

According to a further aspect of the invention, a vehicle, in particular a passenger car, with the glazing unit according to the invention is described.

A further aspect of the invention comprises the use of the glazing unit according to the invention in means of transportation on land, in the air or in water, in particular in motor vehicles, for example, as a windshield, rear pane, side pane and/or roof pane, and as a functional individual piece, and as a component in furniture, devices and buildings.

In the following, the invention is explained in more detail with reference to figures and exemplary embodiments. The figures are schematic representations and not to scale. The figures do not limit the invention in any way.

Figure 2:
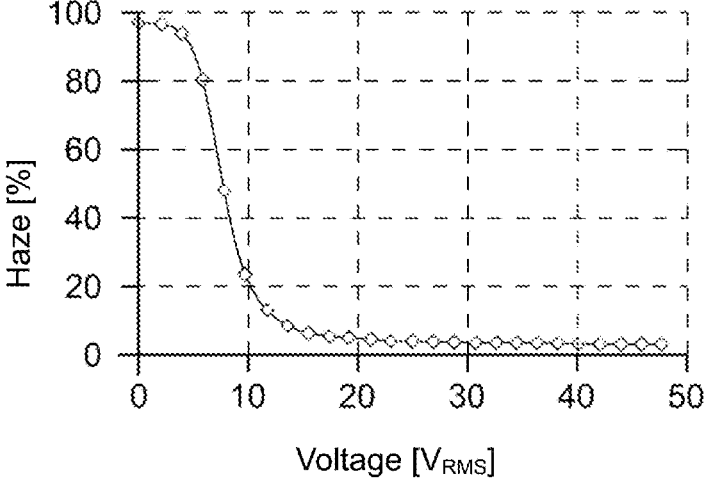
Figure 3:
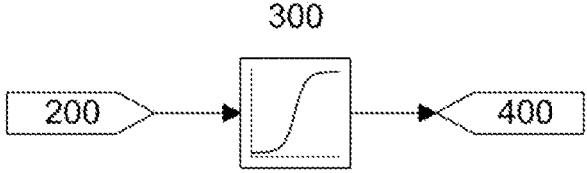
Figure 4:
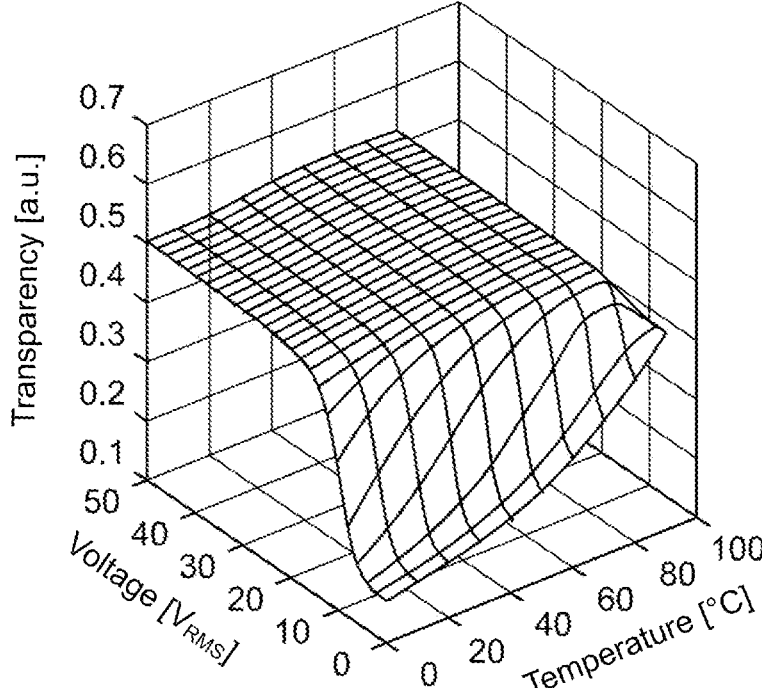
Figure 5:
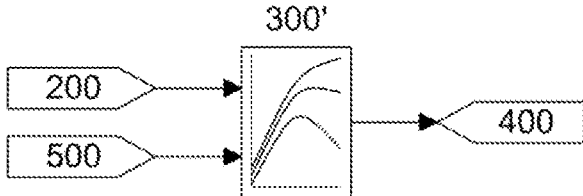

The following is shown:

FIG. 1 shows a schematic representation of a glazing unit,

FIG. 2 shows a diagram of the haze of an electrically controllable functional element as a function of an electrical voltage applied to the planar electrodes of the functional element, FIG. 3 shows a schematic representation of an embodiment of a method according to the invention, FIG. 4 shows a diagram of the transparency of the electrically controllable functional element as a function of the electrical voltage and the temperature, and FIG. 5 shows a schematic representation of a further embodiment of the method according to the invention.

In the exemplary embodiments, the described components each represent features of the invention that are to be considered independently of one another and which are also to be regarded as part of the invention individually or in a combination other than the combination shown.

Data with numerical values are generally not to be understood as exact values, but also include a tolerance of +/−1% up to +/−10%.

FIG. 1 shows a schematic representation of a glazing unit 100, which may be installed, for example, in a motor vehicle or in a building. The glazing unit 100 comprises a composite pane 1. The composite pane 1 comprises an outer pane 1a and an inner pane 1b, which are connected to one another via an intermediate layer 3. The outer pane 1a has a thickness of 2.1 mm and consists of a soda-lime glass. The inner pane 1b has a thickness of 1.6 mm and consists of a soda-lime glass.

In a central region, the composite pane 1 is equipped with a functional element 2 embedded in the intermediate layer 3. The intermediate layer 3 comprises a total of three thermoplastic layers which are each formed by a thermoplastic film that has a thickness of 0.38 mm and is made of PVB. The first thermoplastic layer 3a is connected to the outer pane 1, the second thermoplastic layer 3b is connected to the inner pane 1b. The third thermoplastic layer in between surrounds the cut-to-size functional element 2 (PDLC multilayer film) in a substantially flush manner on all sides. The functional element 2 is thus completely embedded in the thermoplastic material and protected thereby.

The composite pane 1 is equipped with a temperature sensor 4 for detecting the temperature. The temperature sensor 4 is connected to the control unit 11 in such a way that the control unit 11 can ascertain the temperature of the composite pane 1 by means of the temperature sensor 4. The measurement signal of the temperature sensor 4 is thus transmitted to the control unit 11 and evaluated there so that the control unit 11 detects the temperature of the composite pane 1 and/or of the functional element 2. The temperature sensor 4 is arranged in the composite pane 1. It is embedded in the intermediate layer 3. The temperature sensor 4 is in this case fastened to a surface of the inner pane 1b. Alternatively, the temperature sensor 4 can be fastened externally to the composite pane 1 or assigned thereto. The temperature sensor 4 may also be arranged in the control unit 11 itself or in a fastening element with which the control unit 11 is fastened to the composite pane 1. In principle, it is also possible to use a temperature sensor 4 that is not directly fastened to or integrated in the composite pane 1 but measures the temperature at a distance, for example an IR sensor that is located in the vicinity of the composite pane and oriented toward it.

The composite pane 1 can have a peripheral edge region which is provided with an opaque cover printing. This cover printing is typically formed from a black enamel. It is imprinted as printing ink with a black pigment and glass frits in a screen printing method and is burned into the pane surface. The cover printing is applied, for example, on an interior surface of the outer pane 1a and also on an interior surface of the inner pane 1b. The side edges of the functional element 2 are covered by this cover printing. The control unit 11 and the temperature sensor 4 can be arranged in this opaque edge region, i.e., glued onto the cover printing of the inner pane 2. Here, the control unit 11 does not interfere with the view through the composite pane and is visually inconspicuous. In addition, it is at a short distance from the side edge of the composite pane 1 so that only advantageously short cables are necessary for electrically connecting the functional element 2.

FIG. 1 furthermore shows the switched-on state of the glazing unit 100 with the functional element 2 embedded in the composite pane 1. The glazing unit 100 also comprises a control unit 11 (also referred to as ECU in a motor vehicle) which is electrically connected to the functional element 2 via a closed switch 12 so that an electrical voltage V can be applied to the functional element 2.

The electrical voltage V applied between two planar electrodes 10 of the functional element 2 can be a DC voltage or an AC voltage. In the case of a PDLC functional element, the voltage is an AC voltage. The control unit 11 is equipped with a DC-DC converter, which converts an on-board voltage (primary voltage) into a DC voltage of higher magnitude, for example 65 V (secondary voltage). The secondary voltage must be sufficiently high in order to realize a switching state of the functional element 2 of 100%. The control unit 11 is moreover equipped with an inverter which converts the secondary voltage into an AC voltage.

The optical properties of the glazing unit 100 are controlled by means of the control unit 11. To this end, the control unit 11 is electrically connected to the two transparent planar electrodes 10 of the functional element 2.

The functional element 2 is a multilayer film consisting of an active layer 9, the two planar electrodes 10, and two carrier films. Such multilayer films are commercially available as PDLC multilayer films. The active layer 9 is arranged between the two planar electrodes 10. The active layer 9 contains a polymer matrix with therein dispersed liquid crystals, which align depending on the electrical voltage applied to the planar electrodes 10, whereby the optical properties can be controlled. The carrier films consist of PET and have a thickness of about 0.125 mm. The carrier films are provided with a coating that is made of ITO of a thickness of about 100 nm (nanometers) and points to the active layer 9, which form the planar electrodes 10. The planar electrodes 10 are formed free of insulation lines. They are designed to cover the entire surface, i.e., they each form a coherent, complete layer. They have no partitions or segments.

FIG. 2 shows a diagram of the haze of a PDLC functional element plotted against a voltage $V_{RMS}$ applied to the planar electrodes at room temperature of about 25° C. and without the method according to the invention being used. The measurements shown in the diagram form a calibration function of the functional element 2, in particular of the temperature-dependent calibration function. The diagram clearly shows that the haze does not behave linearly with the applied voltage. In order to reduce the haze by 50%, a voltage must be reduced by more than 50%.

FIG. 3 shows a schematic representation of an embodiment of a method according to the invention. In order to obtain a linear behavior of the optical properties of the functional element 2, an inverse function 300 is applied to a desired value 200 of the haze. The inverse function 300 is determined from the calibration function of the functional element 2. This results in a voltage value 400 which can be applied to the planar electrodes in order to achieve a desired transparency of the functional element 2.

FIG. 4 shows a diagram of the transparency of the electrically controllable functional element 2 as a function of the electrical voltage $V_{RMS}$ and the temperature of the functional element 2. The diagram clearly shows a temperature dependence of the transparency.

FIG. 5 shows a schematic representation of a further embodiment of the method according to the invention. Since the transparency of the functional element 2 is temperature-dependent, a temperature-dependent inverse function 300' is applied as a temperature-dependent linearization function in order to determine a voltage value 400. For this purpose, a temperature value 500 of the functional element 2 or of the composite pane 1 is determined.

A great advantage of the invention is that the switching behavior of the glazing unit is improved by ascertaining the temperature, since the temperature detected by the temperature sensor can be taken into account in the control of the functional element.

LIST OF REFERENCE SIGNS

1 Glazing unit
1*a* Outer pane
1*b* Inner pane
2 Functional element
3 Intermediate layer
3*a* First thermoplastic layer
3*b* Second thermoplastic layer
4 Sensor
9 Active layer
10 Planar electrodes
11 Control unit
12 Switch
100 Glazing unit
200 Transparency value
300, 300' Inverse function
400 Voltage value
500 Temperature value

The invention claimed is:

1. A method for the electrical control of at least one functional element embedded in a glazing unit and having electrically controllable optical properties, wherein the glazing unit comprises a composite pane having an outer pane and an inner pane which are connected to one another via a thermoplastic intermediate layer, the functional element is arranged between the outer pane and the inner pane and has an active layer having electrically controllable optical properties between a first planar electrode and a second planar electrode, the optical properties are controlled by means of a control unit, wherein the control unit is connected to at least two transparent planar electrodes of the functional element, an electrical voltage is applied between the at least two transparent planar electrodes by means of the control unit, the method comprising:

determining, using an inverse function, a magnitude of the electrical voltage, wherein the inverse function is used as a temperature-dependent linearization function to obtain a linear behavior of one or more of the controllable optical properties of the at least one functional element, detecting a temperature of the functional element or of the composite pane by means of a temperature sensor, and transmitting the temperature of the functional element or of the composite pane to the control unit, wherein the magnitude of the electrical voltage between the at least two transparent planar electrodes is ascertained and applied by means of the control unit as a function of the temperature of the functional element or of the composite pane.

2. The method according to claim 1, wherein the temperature sensor is arranged on a flat conductor or a flexible circuit board in the glazing unit.

3. The method according to claim 1, wherein the temperature sensor is a temperature-dependent resistor or an IR sensor.

4. The method according to claim 1, wherein the temperature sensor is spatially assigned to the functional element and detects an actual temperature of the functional element.

5. The method according to claim 3, wherein a transparency value of the functional element is ascertained as a function of the temperature of the functional element.

6. The method according to claim 1, wherein the at least two transparent planar electrodes are formed free of insulation lines.

7. The method according to claim 1, wherein the temperature of the functional element or of the composite pane is from 30° C. to 80° C.

8. A glazing unit having electrically controllable optical properties, comprising:

a composite pane having an outer pane and an inner pane which are connected to one another via a thermoplastic intermediate layer, an electrically controllable functional element which is arranged between the outer pane and the inner pane and has an active layer having electrically controllable optical properties between a first planar electrode and a second planar electrode, a control unit for controlling the optical properties of the functional element, wherein the control unit is provided to carry out a method according to claim 1.

9. The glazing unit according to claim 8, wherein the temperature sensor is arranged in an edge region of the composite pane.

10. The glazing unit according to claim 8, wherein the functional element is a PDLC functional element, an SPD functional element or an electrochromic functional element.

11. The glazing unit according to claim 8, wherein the control unit comprises a DC-DC converter and/or an inverter.

12. A vehicle with a glazing unit according to claim 8.

13. The vehicle according to claim 12, wherein the vehicle is a passenger car.

14. A method comprising providing the glazing unit according to claim 8 in a vehicle of transportation for traffic, in the air or in water or as a functional individual piece, or as a component in furniture, a device or a building.

15. The method according to claim 14, wherein the vehicle of transportation is a motor vehicle.

16. The method according to claim 14, wherein the glazing unit is a windshield, a rear pane, a side pane and/or a roof pane of the vehicle of transportation.

17. The method according to claim 7, wherein the temperature of the functional element or of the composite pane is from 40° C. to 60° C.

18. A method for the electrical control of at least one functional element embedded in a glazing unit and having electrically controllable optical properties, wherein the glazing unit comprises a composite pane having an outer pane and an inner pane which are connected to one another via a thermoplastic intermediate layer, the functional element is arranged between the outer pane and the inner pane and has an active layer having electrically controllable optical properties between a first planar electrode and a second planar electrode, the optical properties are controlled by means of a control unit, wherein the control unit is connected to at least two transparent planar electrodes of the functional element, an electrical voltage is applied between the at least two transparent planar electrodes by means of the control unit, the method comprising:

determining, using an inverse function, a magnitude of the electrical voltage, wherein the inverse function is used as a temperature-dependent linearization function, detecting a temperature of the functional element or of the composite pane by means of a temperature sensor, and transmitting the temperature of the functional element or of the composite pane to the control unit, wherein the magnitude of the electrical voltage between the at least two transparent planar electrodes is ascertained and applied by means of the control unit as a function of the temperature of the functional element or of the composite pane, and wherein the linearization function is the inverse function of a calibration function of the functional element.

*   *   *   *   *